US011822084B2

(12) United States Patent
Adema et al.

(10) Patent No.: US 11,822,084 B2
(45) Date of Patent: Nov. 21, 2023

(54) DIRECTION OF LIGHT PROPAGATION IN WEARABLE OPTICAL DEVICES

(71) Applicant: GOOGLE LLC, Mountain View, CA (US)

(72) Inventors: Daniel Adema, Kitchener (CA); Jaehong Choi, Waterloo (CA)

(73) Assignee: GOOGLE LLC, Mountain View, CA (US)

(*) Notice: Subject to any disclaimer, the term of this patent is extended or adjusted under 35 U.S.C. 154(b) by 79 days.

(21) Appl. No.: 17/212,750

(22) Filed: Mar. 25, 2021

(65) Prior Publication Data

US 2022/0269078 A1    Aug. 25, 2022

Related U.S. Application Data

(60) Provisional application No. 63/004,106, filed on Apr. 2, 2020.

(51) Int. Cl.
| | | |
|---|---|---|
| *G02B 27/01* | (2006.01) | |
| *F21V 8/00* | (2006.01) | |
| *G02B 27/00* | (2006.01) | |
| *G02C 9/04* | (2006.01) | |

(52) U.S. Cl.
CPC ....... *G02B 27/0172* (2013.01); *G02B 6/0016* (2013.01); *G02B 27/0081* (2013.01); *G02C 9/04* (2013.01); *G02B 2027/0118* (2013.01); *G02B 2027/0123* (2013.01); *G02B 2027/0178* (2013.01)

(58) Field of Classification Search
CPC ............ G02B 27/0172; G02B 27/0081; G02B 6/0016; G02B 2027/0118; G02B 2027/0123; G02B 2027/0178; G02C 9/04
See application file for complete search history.

(56) References Cited

U.S. PATENT DOCUMENTS

| | | | | |
|---|---|---|---|---|
| 5,850,498 A | * | 12/1998 | Shacklette | G02B 6/30 385/129 |
| 6,152,609 A | * | 11/2000 | Dzyck | G02B 6/3888 385/86 |
| 6,207,968 B1 | * | 3/2001 | Koren | G01T 1/2012 250/584 |
| 6,298,178 B1 | * | 10/2001 | Day | G02B 6/125 385/129 |
| 7,443,555 B2 | * | 10/2008 | Blug | G01S 7/4812 356/4.01 |
| 7,455,431 B2 | * | 11/2008 | Brower | F21V 11/02 362/297 |
| 9,876,949 B2 | * | 1/2018 | Wang | H04N 23/57 |
| 9,939,647 B2 | * | 4/2018 | Vallius | G02B 27/0081 |
| 10,241,332 B2 | * | 3/2019 | Vallius | G02B 6/34 |

(Continued)

*Primary Examiner* — Andrew Jordan

(57) ABSTRACT

An optical device includes a light guide (LG) attached to a support component. The LG receives a display light from a light engine, and directs a first portion of the display light out of the LG to form an outcoupled light. The LG also causes a second portion of the display light to become incident upon an outer perimeter of the LG at one or more LG regions of the LG to form one or more stray lights, respectively. The LG may be mechanically coupled to the support component at one or more coupling regions positioned outside of the one or more LG regions. A wearable heads-up display (WHUD) can incorporate the optical device.

21 Claims, 16 Drawing Sheets

(56) References Cited

U.S. PATENT DOCUMENTS

| | | | | |
|---|---|---|---|---|
| 10,429,645 B2* | 10/2019 | Vallius | G02B 27/0172 |
| 10,642,045 B2* | 5/2020 | Wall | G02B 27/0081 |
| 10,698,221 B2* | 6/2020 | Vieira | G02B 5/1819 |
| 10,969,541 B2* | 4/2021 | Schade | G02B 6/021 |
| 10,969,585 B2* | 4/2021 | Tervo | G02B 27/4205 |
| 11,067,811 B2* | 7/2021 | Chi | G02B 27/0081 |
| 11,169,379 B2* | 11/2021 | Chi | G02B 6/0026 |
| 11,175,511 B2* | 11/2021 | Chi | H04N 9/3152 |
| 11,187,904 B2* | 11/2021 | Chi | G02B 6/0016 |
| 11,415,883 B2* | 8/2022 | Singh | G03F 7/40 |
| 2006/0203493 A1* | 9/2006 | Brower | F21V 11/02 |
| | | | 362/342 |
| 2007/0058230 A1* | 3/2007 | Blug | G02B 26/105 |
| | | | 250/234 |
| 2014/0313585 A1* | 10/2014 | Jarvenpaa | G02B 27/0172 |
| | | | 359/630 |
| 2017/0102543 A1* | 4/2017 | Vallius | G06T 19/006 |
| 2017/0102544 A1* | 4/2017 | Vallius | G02B 27/0172 |
| 2017/0264800 A1* | 9/2017 | Wang | H04N 13/239 |
| 2017/0363871 A1* | 12/2017 | Vallius | G02B 6/0016 |
| 2018/0046859 A1* | 2/2018 | Jarvenpaa | H04N 5/332 |
| 2018/0292653 A1* | 10/2018 | Tervo | G02B 6/0016 |
| 2018/0292654 A1* | 10/2018 | Wall | H04N 9/315 |
| 2019/0170930 A1* | 6/2019 | Schade | G01D 5/35316 |
| 2021/0215936 A1* | 7/2021 | Tervo | G02B 6/0038 |
| 2022/0137408 A1* | 5/2022 | Bohn | G02B 27/0081 |
| | | | 345/8 |
| 2022/0269078 A1* | 8/2022 | Adema | G02B 6/0016 |
| 2022/0283376 A1* | 9/2022 | Waldern | G03H 1/0244 |
| 2022/0283378 A1* | 9/2022 | Waldern | G02B 5/1857 |

* cited by examiner

1600

Mechanically coupling a support component to a light guide (LG) at one or more coupling regions, the LG to receive a display light from a light engine, direct a first portion of the display light out of the LG to form an outcoupled light, and cause a second portion of the display light to become incident upon an outer perimeter of the LG at one or more LG regions of the LG to form one or more stray lights respectively, the coupling regions positioned outside of the one or more LG regions

DIRECTION OF LIGHT PROPAGATION IN WEARABLE OPTICAL DEVICES

CROSS-REFERENCE TO RELATED APPLICATIONS

The present application claims priority to U.S. Provisional Patent Application Ser. No. 63/004,106, entitled "OPTICAL DEVICES AND METHODS OF MAKING THEREOF" and filed on Apr. 2, 2020, the entirety of which is incorporated by reference herein.

BACKGROUND

Displays may be used to form still or moving images. Some displays may use a display panel to form images. Examples of such display panels include Light Emitting Diode (LED) display panels, Liquid Crystal Display (LCD) panels, and the like. In addition, some displays may use projectors to project still or moving images. Some displays may be used to form, or as a part of, mobile or wearable devices. For example, some displays may form or be part of a wearable heads-up display.

BRIEF SUMMARY OF EMBODIMENTS

According to an implementation of the present specification there is provided an optical device comprising. a light guide (LG) and a support component supporting the LG, the LG including an incoupler (IC), an exit pupil expander (EPE), and an outcoupler (OC). The IC may be to receive a display light from a light engine, to direct a first portion of the display light into the LG to form an incoupled light propagating in the LG towards the EPE, and to direct a second portion of the display light into the LG to form a first stray light propagating in the LG away from the EPE. The EPE may be to receive the incoupled light propagating in the LG, to direct a first portion of the incoupled light towards the OC to form an intermediate light, and to cause a second portion of the incoupled light to continue propagating in the LG in a direction other than towards the OC to form a second stray light. The OC may be to receive the intermediate light propagating in the LG, to direct a first portion of the intermediate light out of the LG to form an outcoupled light, and to cause a second portion of the intermediate light to continue propagating in the LG to form a third stray light. The support component may be mechanically coupled to the LG at one or more coupling regions.

The first stray light may be to become incident upon an outer perimeter of the LG at a first region of the outer perimeter. The second stray light may be to become incident upon the outer perimeter of the LG at a second region of the outer perimeter. The third stray light may be to become incident upon the outer perimeter of the LG at a third region of the outer perimeter. The one or more coupling regions may be positioned outside of the first region, the second region, and the third region.

The support component may comprise an eyeglass lens.
The support component may comprise a lens of a wearable heads-up display (WHUD).
The support component may comprise a front frame of eyeglasses.
The support component may comprise a front frame of a WHUD.
The OC may be further to cause a third portion of the intermediate light to propagate in the LG towards the EPE to form a fourth stray light, the fourth stray light to become incident upon the outer perimeter of the LG at a fourth region of the outer perimeter. The coupling regions may be positioned outside of the first region, the second region, the third region, and the fourth region.

According to another implementation of the present specification there is provided a wearable heads-up display (WHUD) comprising a support structure, a light engine attached to the support structure, and a light guide (LG). The light engine may be to generate a display light. The LG may include an incoupler (IC), an exit pupil expander (EPE), and an outcoupler (OC). The IC may be to receive the display light from the light engine and direct a first portion of the display light into the LG to form an incoupled light propagating in the LG towards the EPE, and to direct a second portion of the display light into the LG to form a first stray light propagating in the LG away from the EPE. The EPE may be to receive the incoupled light propagating in the LG, to direct a first portion of the incoupled light towards the OC to form an intermediate light, and to cause a second portion of the incoupled light to continue propagating in the LG in a direction other than towards the OC to form a second stray light. The OC may be to receive the intermediate light propagating in the LG, to direct a first portion of the intermediate light out of the LG to form an outcoupled light, and to cause a second portion of the intermediate light to continue propagating in the LG to form a third stray light The WHUD may further comprise a support component supporting the LG and attached to the support structure, the support component mechanically coupled to the LG at one or more coupling regions.

The first stray light may be to become incident upon an outer perimeter of the LG at a first region of the outer perimeter. The second stray light may be to become incident upon the outer perimeter of the LG at a second region of the outer perimeter. The third stray light may be to become incident upon the outer perimeter of the LG at a third region of the outer perimeter. The one or more coupling regions may be positioned outside of the first region, the second region, and the third region.

The support component may comprise an eyeglass lens.
The support structure may comprise an eyeglass frame.
The support component may comprise a front frame of eyeglasses.
The support structure may comprise at least one temple arm of the eyeglasses, the temple arm coupled to the front frame.
The OC may be further to cause a third portion of the intermediate light to propagate in the LG towards the EPE to form a fourth stray light, the fourth stray light to become incident upon the outer perimeter of the LG at a fourth region of the outer perimeter. The coupling regions may be positioned outside of the first region, the second region, the third region, and the fourth region.

According to another implementation of the present specification there is provided a method of assembling an optical device comprising a light guide (LG) to be attached to a support component, the LG being to receive a display light from a light engine, to direct a first portion of the display light out of the LG to form an outcoupled light, and to cause a second portion of the display light to become incident upon an outer perimeter of the LG at one or more LG regions of the LG to form one or more stray lights respectively. The method may comprise mechanically coupling the support component to the LG at one or more coupling regions, the coupling regions positioned outside of the one or more LG regions.

The mechanically coupling may comprise affixing the support component to the LG using an adhesive.

The mechanically coupling may comprise interference fitting the support component to the LG.

The mechanically coupling may comprise mechanically coupling the LG to a lens of eyeglasses.

The mechanically coupling the LG to the lens of the eyeglasses may comprise mechanically coupling the LG to a lens of a wearable heads-up display (WHUD).

The mechanically coupling the LG to the lens of the eyeglasses may comprise at least partially encapsulating the LG in the lens.

The lens may comprise a first lens portion and a second lens portion; and the at least partially encapsulating the LG in the lens may comprise: mechanically coupling the LG to the first lens portion; and mechanically coupling the first lens portion to the second lens portion.

The mechanically coupling may comprise mechanically coupling the LG to a front frame of eyeglasses.

The mechanically coupling the LG to the front frame of the eyeglasses may comprise mechanically coupling the LG to a front frame of a wearable heads-up display (WHUD).

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 16 shows a flowchart of an example method of assembling an optical device, in accordance with one or more embodiments.

DETAILED DESCRIPTION

Figure 1:
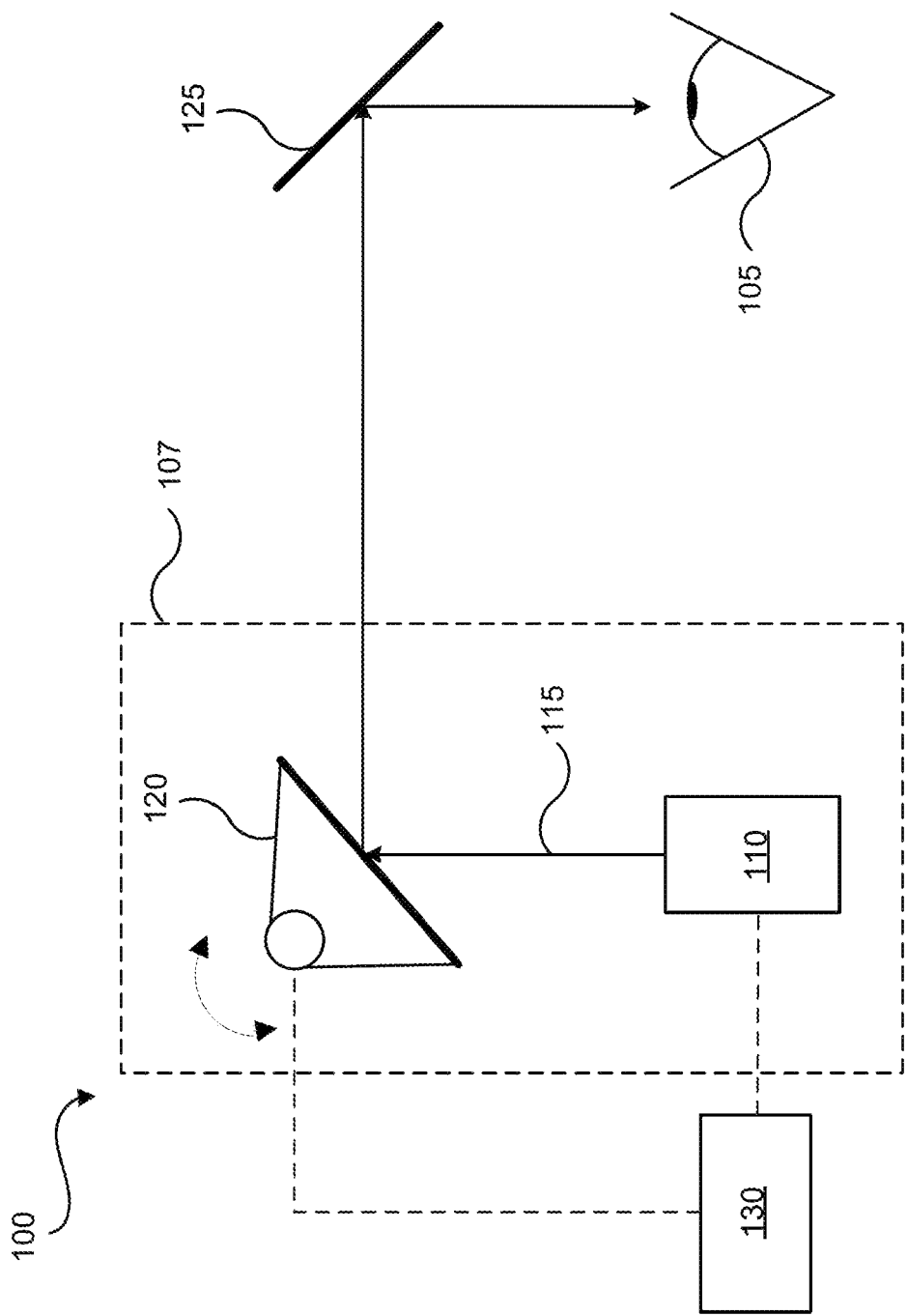
FIG. 1 shows a schematic representation of an example system which may be used to form or project an image, in accordance with one or more embodiments.

In the following description, certain specific details are set forth in order to provide a thorough understanding of various disclosed implementations. However, one skilled in the relevant art will recognize that implementations may be practiced without one or more of these specific details, or with other methods, components, materials, and the like. In certain instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Throughout this specification and the appended claims, the term "carries" or "supports," and variants such as "supported by," "attached to," and "carried by," are generally used to refer to a physical coupling between two objects. The physical coupling may be direct physical coupling (i.e. with direct physical contact between the two objects) or indirect physical coupling that may be mediated by one or more additional objects. Thus, such terms are meant to generally encompass all manner of direct and indirect physical coupling, including without limitation: carried on, carried within, physically coupled to, secured to, attached to, and/or supported by, with or without any number of intermediary physical objects therebetween.

Displays may use an optical device comprising a light guide (LG) to guide and manipulate light to form images. Such a LG may be attached to or physically supported by a support component. Examples of such LGs are described in greater detail in relation to FIGS. 3-15. In some examples, such LGs may comprise an incoupler (IC) to receive a display light and direct at least a portion of the display light into the LG to form an incoupled light. The LG may also comprise an exit pupil expander (EPE). The incoupled light may propagate in the LG and become incident upon the EPE. The EPE may divide the incoupled light into a plurality of offspring beams of light propagating in the LG.

Moreover, the LG may comprise an outcoupler (OC). The OC may receive the offspring beams and may direct some of the offspring beams out of the LG to form beams of outcoupled light propagating towards an eye of a viewer of the display to form an image viewable by the viewer. The viewer may also be described as a user of the display. In some examples, one or more of the IC, EPE, and OC may comprise a diffractive optical element such as a surface relief grating (SRG), a hologram, and the like. The IC, EPE, and OC may also be described as the optical components of the LG.

As the light propagates along optical paths between the IC, EPE, and OC of the LG, some of the incoupled light may deviate from these optical paths to form stray light propagating towards the outer perimeter of the LG. In some examples, such a deviation may comprise the incoupled light being directed by one or more of the IC, EPE, and OC in a direction that deviates from the optical path. Moreover, in some examples, such a deviation may comprise one or more of the IC, EPE, and OC failing to direct at least a portion of the incoupled light along the intended or designed optical path, causing the portion to continue propagating to form the stray light. Examples of such deviations are described in greater detail in relation to FIGS. 5-6 and 14-15. The outer perimeter may refer to the outer edge or edges of the LG. In examples where the LG defines a two-dimensional expanse such as a sheet or a plane, the outer perimeter may refer to the perimeter defining the shape of the expanse of the sheet or plane.

The stray light generated by the optical components of the LG may become incident upon the perimeter of the LG at one or more regions of the outer perimeter. If there is a relatively large refractive index mismatch between the LG and its surroundings at these regions, the stray light may be internally reflected back into the LG and thereby remain in the LG. If, on the other hand, the refractive index mismatch between the LG and its surroundings is relatively small or zero at the regions, some or all of the stray light may propagate through the region of the outer perimeter and leak out of the LG. Such a leakage of the stray light may form visual aberrations or distractions.

The LG may be attached to a support component which is mechanically coupled to the LG at one or more coupling regions. In some examples, these coupling regions may comprise regions with reduced refractive index mismatch between the LG and its surrounding materials. To reduce or avoid such leakages of the stray light as a result of the mechanical coupling of the LG to the support component at the coupling regions, these coupling regions may, in accordance with the present systems, devices, and methods, advantageously be positioned to be outside the regions where the stray light becomes incident upon the perimeter of the LG. Example LGs and optical devices wherein the coupling regions are positioned outside of the given regions are described in greater detail in relation to FIGS. 4-15.

Turning now to FIG. 1, a schematic representation of an example system 100 is shown. System 100 may be used to form or project an image viewable by an eye 105 of a viewer. System 100 may also be referred to or described as an image projection device, a display device, a display system, or a display. System 100 may comprise a light engine 107 to generate a display light 115. In some examples, light engine 107 may comprise a light source 110 in optical communication with a spatial modulator 120. It is also contemplated that in some examples, light engine 107 may comprise a different source of light such as a micro-display, and the like.

Light source 110 may comprise a laser, a light emitting diode, and the like. Spatial modulator 120 may receive display light 115 from light source 110. In some examples, spatial modulator 120 may comprise a movable reflector, a micro-electro-mechanical system (MEMS), a digital micromirror device (DMD), and the like.

Furthermore, system 100 may comprise a LG 125 to receive display light 115 from spatial modulator 120 and direct the display light towards eye 105 of a viewer. In some examples, LG 125 may comprise an IC, EPE, and OC, as described in greater detail in relation to FIG. 3. Moreover, in some examples system 100 may be a part of or incorporated into a wearable heads-up display (WHUD). Such a heads-up display may have different designs or form factors, such as the form factor of eyeglasses, as is described in greater detail in relation to FIG. 2. In examples where system 100 is in the form factor of glasses, LG 125 may be on or in a lens of the glasses.

In addition, system 100 may comprise a controller 130 in communication with light source 110 and spatial modulator 120. Controller 130 may control light source 110 and spatial modulator 120 to project an image. In some examples, the image to be projected may be a still image, a moving image or video, an interactive image, a graphical user interface, and the like.

In some examples, the controllers described herein such as controller 130 may comprise a processor in communication with a non-transitory processor-readable medium. The processor-readable medium may comprise instructions to cause the processors to control the light source and the spatial modulator as described in relation to the methods and systems described herein. Moreover, in some examples the controllers may be free-standing components, while in other examples the controllers may comprise functional modules incorporated into other components of their respective systems.

Furthermore, in some examples the controllers or their functionality may be implemented in other ways, including: via Application Specific Integrated Circuits (ASICs), in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

Figure 2:
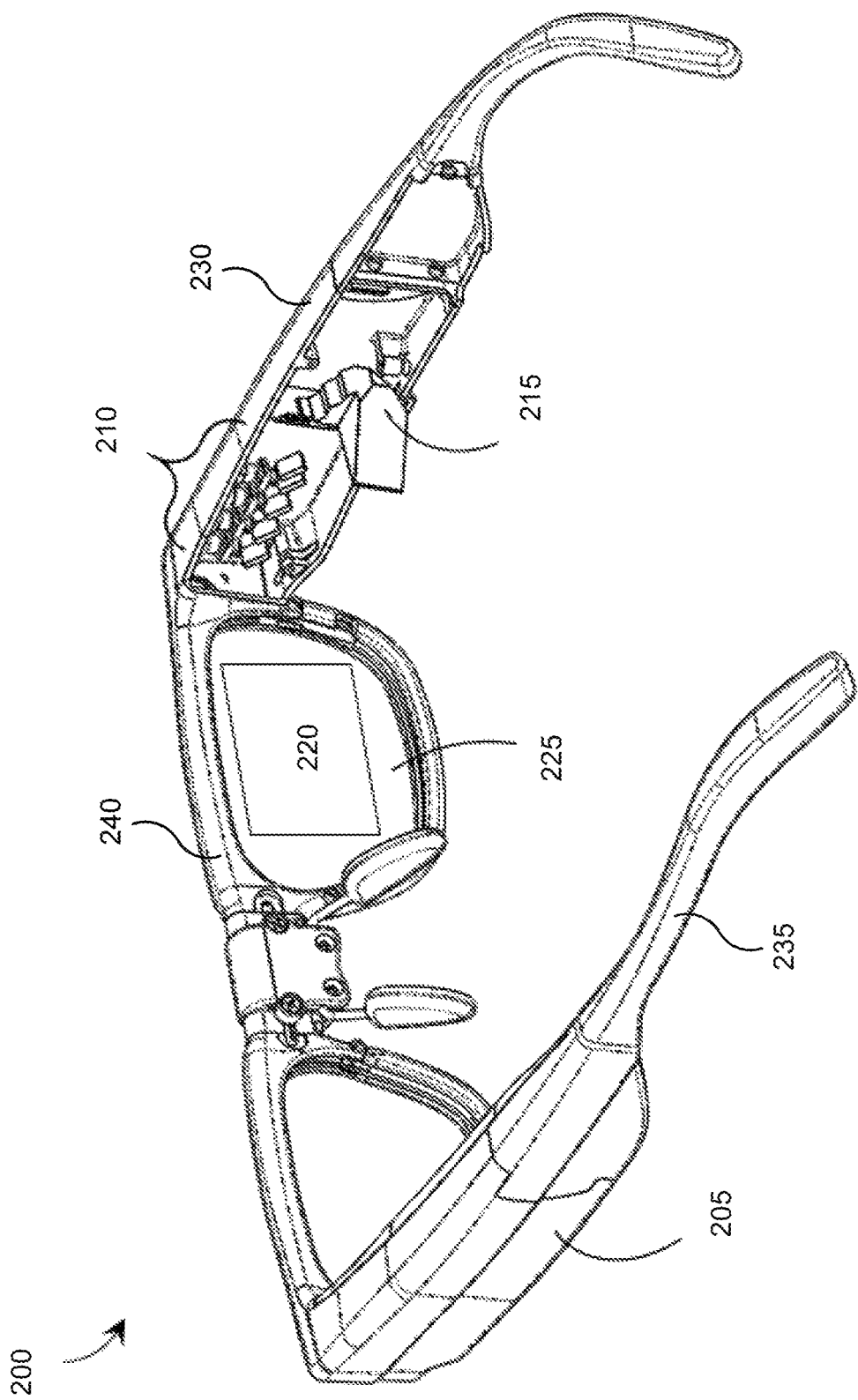
FIG. 2 shows a partial-cutaway perspective view of an example wearable heads-up display (WHUD), in accordance with one or more embodiments.

Turning now to FIG. 2, a partial-cutaway perspective view of an example wearable heads-up display (WHUD) 200 is shown. WHUD 200 includes a support structure 205 that in use is worn on the head of a user and has the general form factor and appearance of an eyeglasses (e.g. sunglasses) frame. Eyeglasses or sunglasses may also be generically referred to as "glasses". Support structure 205 may comprise two temple arms 230 and 235, each foldably coupled to a front frame 240.

Support structure 205 may support components of a system to display an image, such as system 100. For example, light engine 107 may be attached to temple arm 230 of support structure 205. Moreover, in some examples, the light source may be received in a space 210 in temple arm 230 of support structure 205. The spatial modulator of the systems described herein may be received in or be part of component 215 of support structure 205. The spatial modulator in turn may direct the display light onto a LG 220 attached to a lens 225 of support structure 205. In some examples, LG 220 may be similar in structure or function to LG 125. Moreover, in some examples LG 220 may comprise an IC, EPE, and OC, as described in greater detail in relation to FIG. 3.

Furthermore, in some examples, LG 220 may be attached to a support component. In examples where LG 220 is attached to lens 225, lens 225 may be the support component for LG 220. Moreover, in some examples LG 220 may be attached to front frame 240, in which case front frame 240 may be the support component. In examples where front frame 240 is the support component, one or both of temple arms 230 and 235 may be described as a support structure attached to the support component, i.e. front frame 240.

Figure 3:
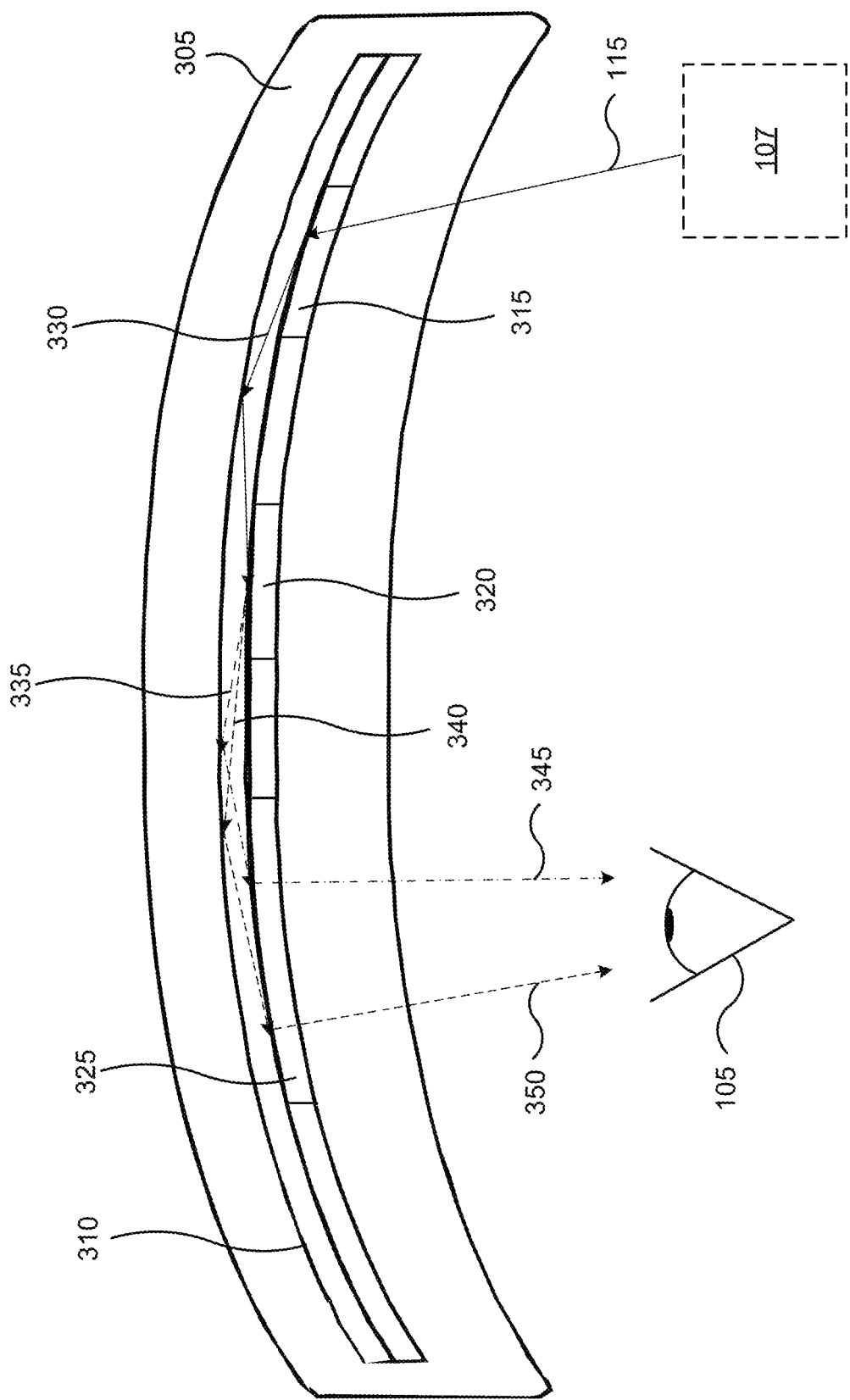
FIG. 3 shows a schematic cross-sectional representation of an example lens of an example wearable heads-up display, in accordance with one or more embodiments.

Turning now to FIG. 3, a schematic cross-sectional representation is shown of an example lens 305 of an example WHUD. The components in FIG. 3 are not cross-hatched to allow for a clearer illustration of the path of an example ray of light traversing these components. In some examples, lens 305 may be used as lens 225 in WHUD 200. Lens 305 has embedded within it a LG 310. LG 310 may be similar to LG 125 or LG 220.

LG 310 comprises an IC 315, an EPE 320, and an OC 325. In some examples, one or more of IC 315, EPE 320, and OC 325 may comprise a diffractive optical element such as a surface relief grading, a hologram, and the like. Moreover, while FIG. 3 shows LG 310 as having two layers, it is contemplated that in some examples the LG may comprise more than two layers or only one layer. In examples where the LG comprises one layer, the IC, EPE, and OC may each be implemented as a diffractive element on a surface or within a given volume of the LG.

As discussed above, it is contemplated that in some examples, LG 310 may be used as LG 125 in system 100. In some examples, LG 310 may guide light within it using total internal reflection. In some examples, when the light within LG 310 becomes incident upon a wall or surface of LG 310 at an angle that is equal to or greater than a critical angle, the light may experience total internal reflection from a wall of the LG back into the LG. The critical angle may be a function of the refractive index of the LG relative to the refractive index of the material surrounding the LG. In the example of FIG. 3, this surrounding material may comprise the material of lens 305 abutting LG 310, or a designed interface material such as an air gap or a low refractive index coating. IC 315 may receive display light 115 generated by light engine 107. IC 315 may then direct at least a portion of display light 115 into LG 310 to form an incoupled light 330. Light 330 may propagate within LG 310 and become incident upon EPE 320. EPE 320 may split light 330 into a plurality of offspring beams of light 335 and 340. Light 335 and 340 may propagate in LG 310 and become incident upon OC 325. OC 325 may direct at least a portion of light 335 and 340 out of LG 310 to form outcoupled beams of light 345 and 350.

Light 345 and 350 may be used to form an image viewable by eye 105 of a user of a display incorporating lens 305 and LG 310. While FIG. 3 shows two offspring beams of light 335, 340 generated by EPE 320, it is contemplated that in some examples the EPE may split a beam of the incoupled light into more than two beams of offspring light. It is also contemplated that in some examples, the LG need not comprise an EPE. In such examples, the incoupled light may propagate from the IC via the LG to the OC. While FIG. 3 shows LG 310 as being curved, it is contemplated that in some examples the LG need not be curved; for example, the LG may be planar or flat.

Figure 4:
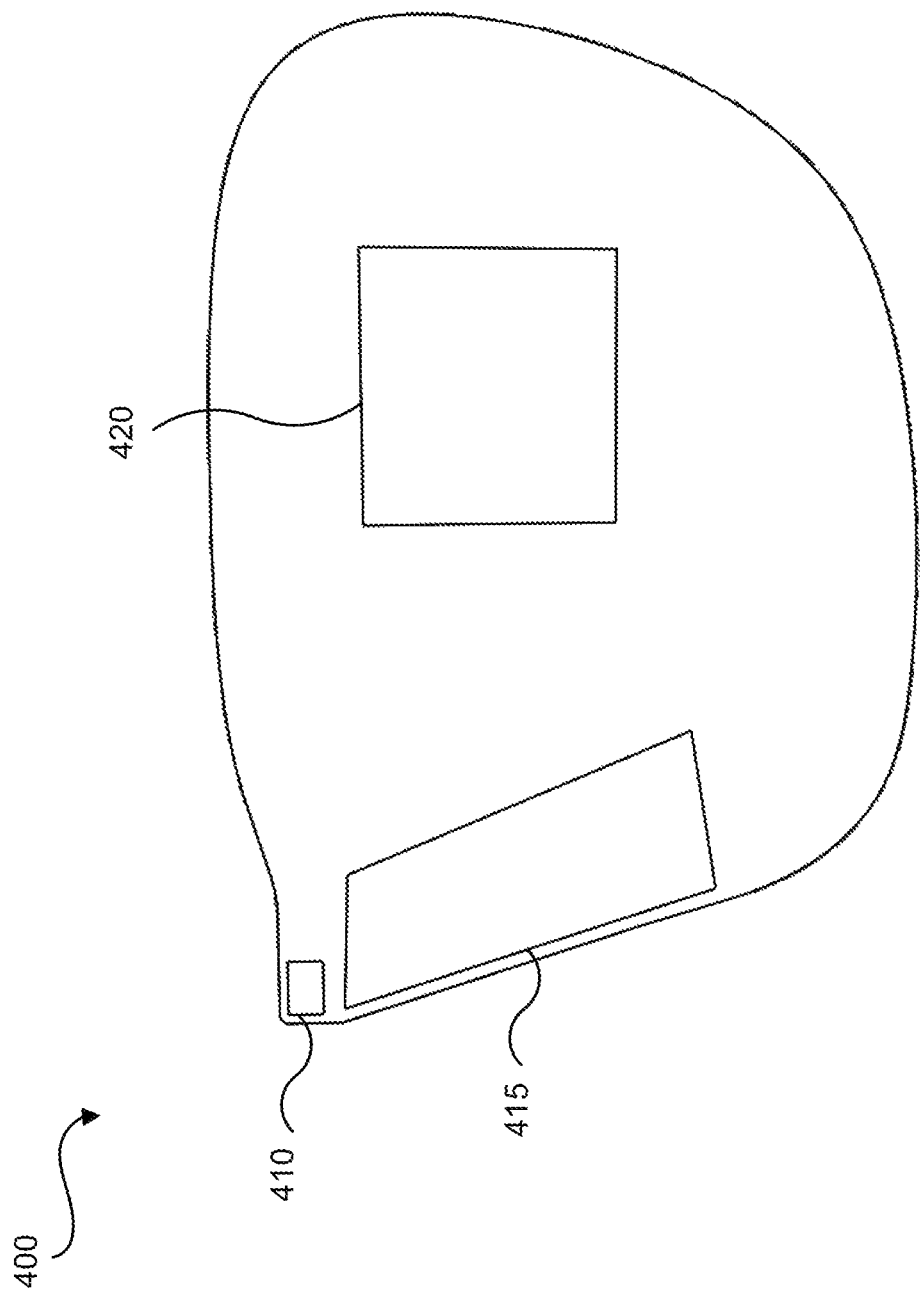
FIG. 4 shows a schematic representation of an example light guide, in accordance with one or more embodiments.

Turning now to FIG. 4, a schematic representation is shown of an example light guide (LG) 400. LG 400 may comprise an IC 410, an EPE 415, and an OC 420. LG 400 has the general shape or outline of a lens of eyeglasses. LG 400 and its IC 410, EPE 415, and OC 420 may have structures or functions similar to LG 310, and its IC 315, EPE 320, and OC 325 respectively.

Figure 5:
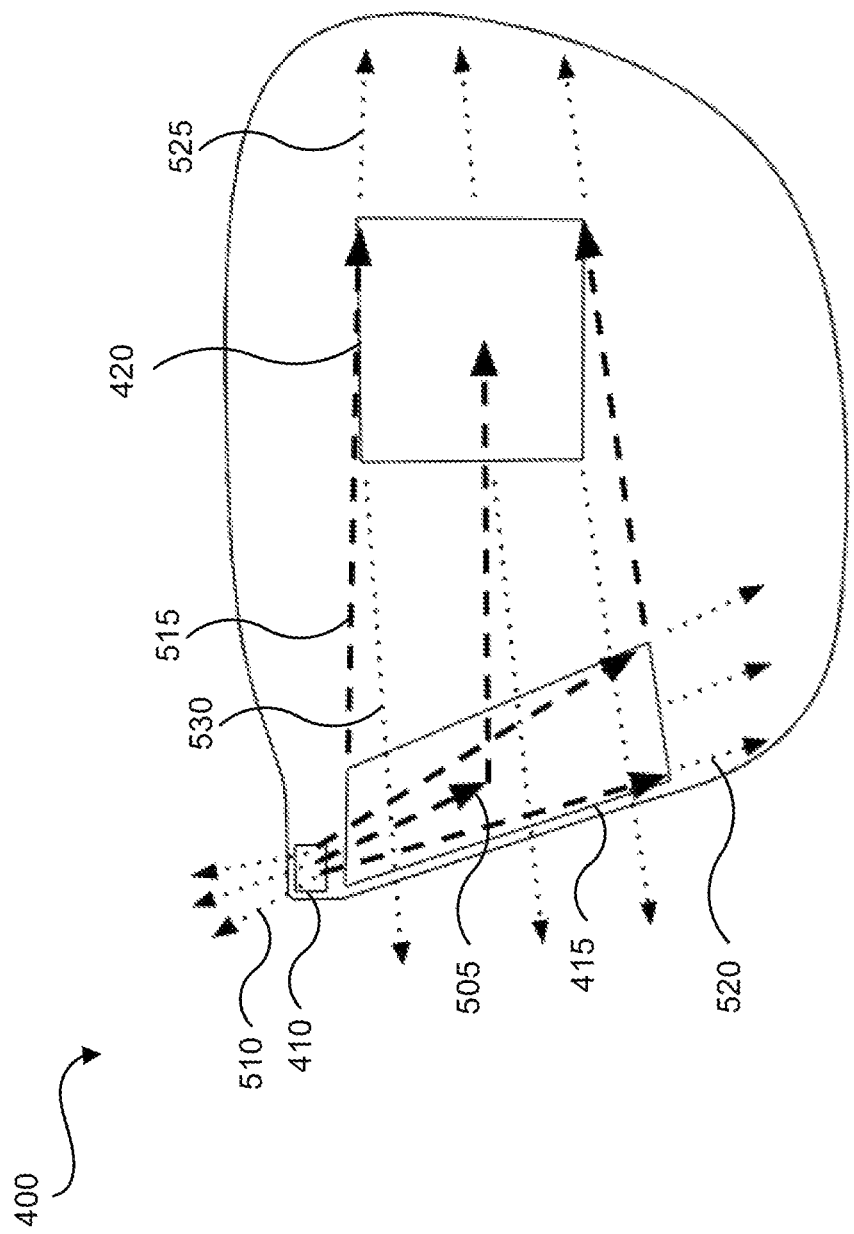
FIG. 5 shows another schematic representation of the light guide of FIG. 4.

Turning now to FIG. 5, IC 410 may receive the display light from a light engine. For simplicity of illustration, the light engine is not shown in FIG. 5. The light engine may be similar to light engine 107 shown in FIG. 1, and the like. IC 410 may direct a first portion of the display light into LG 400 to form an incoupled light 505 propagating in LG 400 towards EPE 415. IC 410 may also direct a second portion of the display light into LG 400 to form a first stray light 510 propagating in LG 400 away from EPE 415. Stray light 510 may become incident upon an outer perimeter of LG 400 at a first region of the outer perimeter and may, in some scenarios such as in the illustrated implementation, continue to propagate outside of LG 400, as will be described in greater detail in relation to FIG. 6.

EPE 415 may receive incoupled light 505 propagating in LG 400, and may direct a first portion of incoupled light 505 towards OC 420 to form an intermediate light 515. EPE 415 may also cause a second portion of incoupled light 505 to continue propagating in LG 400 in a direction other than towards OC 420 to form a second stray light 520. Second stray light 520 may become incident upon the outer perimeter of LG 400 at a second region of the outer perimeter, as will be described in greater detail in relation to FIG. 6.

OC 420 may receive intermediate light 515 propagating in LG 400 and direct a first portion of intermediate light 515 out of LG 400 to form an outcoupled light. The outcoupled light is not depicted in FIG. 5. In some examples, this outcoupled light may be similar to light 345 or 350 shown in FIG. 3. OC 420 may also cause a second portion of intermediate light 515 to continue propagating in LG 400 to form a third stray light 525. Third stray light 525 may become incident upon the outer perimeter of LG 400 at a third region of the outer perimeter, as described in greater detail in relation to FIG. 6.

Figure 6:
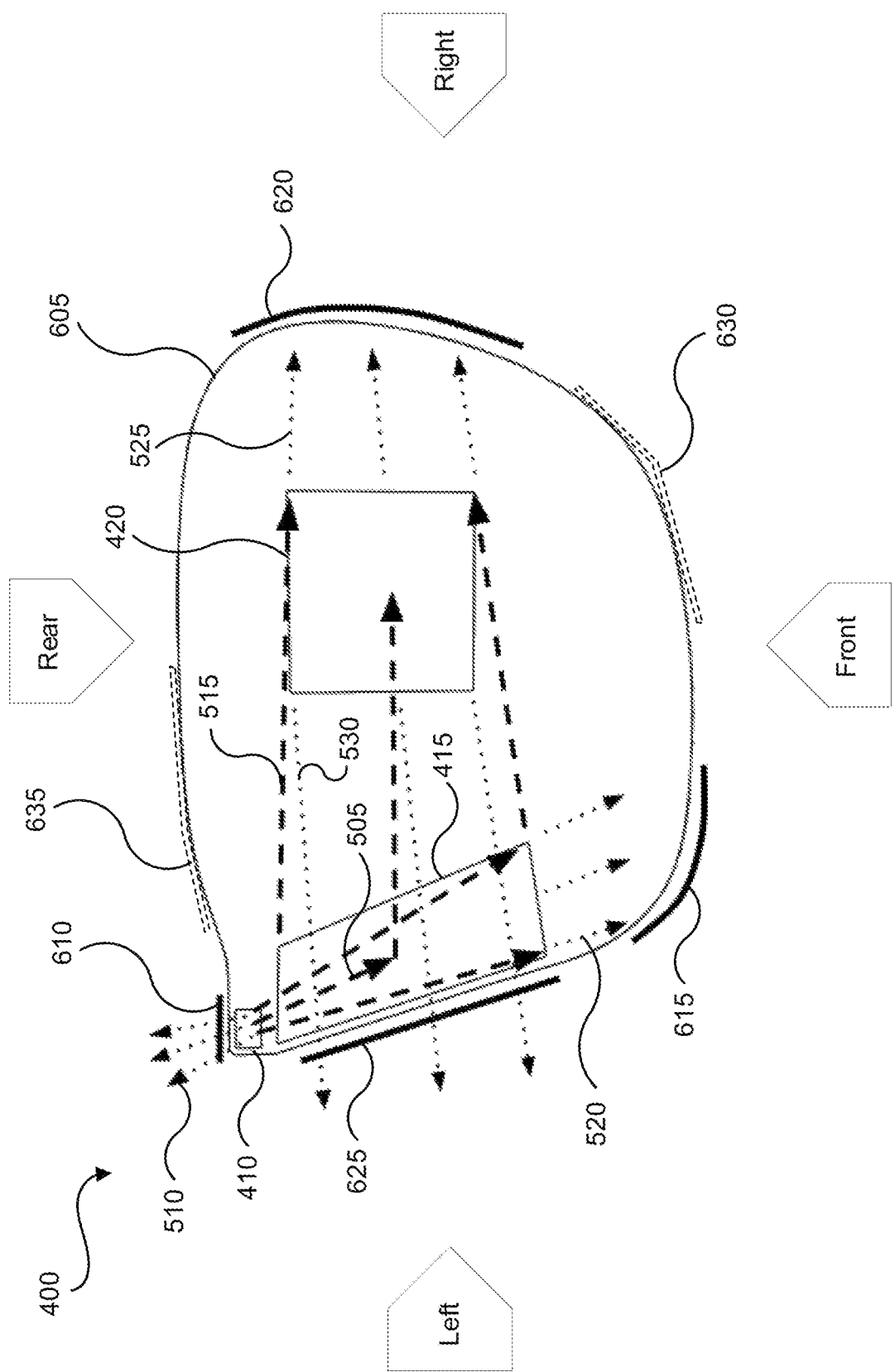
FIG. 6 shows yet another schematic representation of the light guide of FIG. 4.

In some examples, OC 420 may further cause the third portion of intermediate light 515 to propagate in LG 400 back towards EPE 415 to form a fourth stray light 530. Fourth stray light 530 may become incident upon the outer perimeter of LG 400 at a fourth region of the outer perimeter, as described in greater detail in relation to FIG. 6. For each of the stray lights 510, 520, 525, and 530, FIG. 6 shows a corresponding plurality or "bundle" of beams of light. Each of the beams of light in this plurality or bundle of beams of light corresponds to the display light becoming incident upon IC 410 at a given position or angle relative to IC 410. As such, the plurality or bundle of beams of light depicted in FIG. 5 in relation to each of the stray lights corresponds to the range of possible positions and angles of incidence of the display light relative to IC 410.

It is contemplated that LG 400 may also generate stray light other than stray lights 510, 520, 525, and 530 shown in FIG. 5. Each bundle of beams of incoupled light has a respective bundle of designated optical paths extending from IC 410 to EPE 415, from EPE 415 to OC 420, and from OC 420 out of LG 400 to form a corresponding bundle of beams of outcoupled light. Beams of light propagating in LG 400 that deviate from these designated optical paths and become incident upon the outer perimeter of LG 400 may form stray light.

FIG. 6 shows the regions where the stray lights become incident upon the outer perimeter 605 of LG 400. Stray light 510 becomes incident upon outer perimeter 605 at a first region 610 of outer perimeter 605. In other words, based on the position or angle of the display light relative to IC 410, the corresponding beam of stray light 510 may become incident upon outer perimeter 605 anywhere along region 610.

Moreover, stray light 520 may become incident upon perimeter 605 at or along a second region 615 of outer perimeter 605. Furthermore, stray light 525 may become incident upon perimeter 605 at or along a third region 620 of perimeter 605. In addition, stray light 530 may become incident upon outer perimeter 605 at or along a fourth region 625 of outer perimeter 605. While FIG. 6 shows stray light 530 becoming incident upon perimeter 605 along region 625, it is contemplated that in some examples stray light 530 need not be generated in LG 400. In such examples where there is no stray light 530, there may be no region 625 where stray light 530 becomes incident upon perimeter 605.

While FIG. 6 shows first region 610 using a bolded line displaced from the actual outer perimeter 605 of LG 400, this displacement is for clarity of illustration and the bolded line corresponding to first region 610 is intended to demarcate a portion of the perimeter 605 of LG 400. The same is true of the bolded lines corresponding to regions 615, 620, and 625.

Moreover, while FIG. 6 shows four regions 610, 615, 620, and 625 having their given sizes and positions along outer perimeter 605 of LG 400, it is contemplated that in some examples the regions along the perimeter corresponding to the stray lights may have different numbers, sizes, or positions along perimeter 605.

To incorporate LG 400 into a display or WHUD, LG 400 may be mechanically coupled to or attached to a support component. The support component may be mechanically coupled to LG 400 at one or more coupling regions. These coupling regions may represent regions of relatively reduced refractive index mismatch between LG 400 and its surroundings because at these coupling regions LG 400 may interface with a material that has an index mismatch with LG 400 that is smaller than the index mismatch between the LG and the other materials that surround the perimeter and/or surface of LG 400. As LG 400 is a three-dimensional object, a portion or region of the perimeter of LG 400 may describe a given two-dimensional portion or given area of the surface of LG 400. In some examples, such other materials that surround the other portions of the perimeter of LG 400 may include air, low index coating(s), and the like.

Since the coupling regions may represent regions of reduced refractive index mismatch between LG 400 and the material interfacing with the perimeter of LG 400 at the coupling region, coupling regions may allow for stray lights incident upon the perimeter of LG 400 in the coupling regions to at least partially leak out of LG 400. A reduced refractive index mismatch between LG 400 and the material interfacing with the perimeter of LG 400 may reduce the portion of the stray light that is totally internally reflected by the outer perimeter or surface of the LG back into the LG. The portion of the stray light that is not totally internally reflected back into the LG may be transmitted or leak out of the LG. In order to avoid such light leakage, the coupling regions may be positioned outside of the regions where the stray light is likely to become incident upon the perimeter of LG 400. In the example of FIG. 6, the coupling regions may be positioned outside of regions 610, 615, 620, and 625 of perimeter 605 of LG 400. As LG 400 is a three-dimensional object, regions 610, 615, 620, and 625 of perimeter 605 may describe two-dimensional portions or areas of the surface of LG 400.

FIG. 6 shows schematic representations of two coupling regions 630 and 635 which may be used to mechanically couple LG 400 to its support component. Coupling regions 630 and 635 are intended to demarcate regions of outer perimeter 605 of LG 400 at which regions LG 400 is mechanically coupled to its support component. As shown in FIG. 6, coupling regions 630 and 635 are positioned outside of regions 610, 615, 620, and 625. Moreover, while FIG. 6 shows two coupling regions 630 and 635, it is contemplated that in some examples LG 400 may be mechanically coupled to its support component at coupling regions that may have sizes, positions, or numbers that are different than those shown in FIG. 6.

In some examples, the support component may comprise a lens of eyeglasses. Moreover, in some examples the lens may be a lens of a WHUD. Examples of such lenses are described in greater detail in relation to FIGS. 3, 8 and 9. Furthermore, in some examples, the support component may comprise a front frame of eyeglasses. In some examples, the front frame may be a front frame of a WHUD. Examples of such front frames and WHUDs are described in greater detail in relation to FIGS. 2, and 10-12.

While FIG. 6 shows a particular size and positioning of IC 410, EPE 415, OC 420, and regions 610, 615, 620, and 625, it is contemplated that in some examples the sizes are positions of these optical components and regions may be different than those shown in FIG. 6. An example LG with different optical component and perimeter region sizes and positions is described in relation to FIGS. 13-15.

While FIG. 6 shows perimeter 605 of LG 400 as having the shape of a lens of glasses, it is contemplated that in some examples, a LG may have a perimeter of a different shape. For example, a LG may have a perimeter that is smaller than the perimeter of the lens. In other words, in some examples, a LG need not be coextensive with the lens, and may be smaller than or may fit within the expanse of the lens. Moreover, while FIG. 6 shows LG 400 as comprising IC 410, EPE 415, and OC 420 as three separate components, it is contemplated that in some examples a LG need not comprise an EPE. In such examples, the incoupled light may propagate from the IC to the OC via the LG. Furthermore, it is contemplated that in some examples, the functionality of the EPE may be incorporated into the OC.

In addition, while FIG. 6 shows stray lights 510, 520, 525, and 530, it is contemplated that in some examples the stray lights generated by the optical components of LG 400 may be different than those shown in FIG. 6 in number, direction of propagation, and the like.

Figure 7:
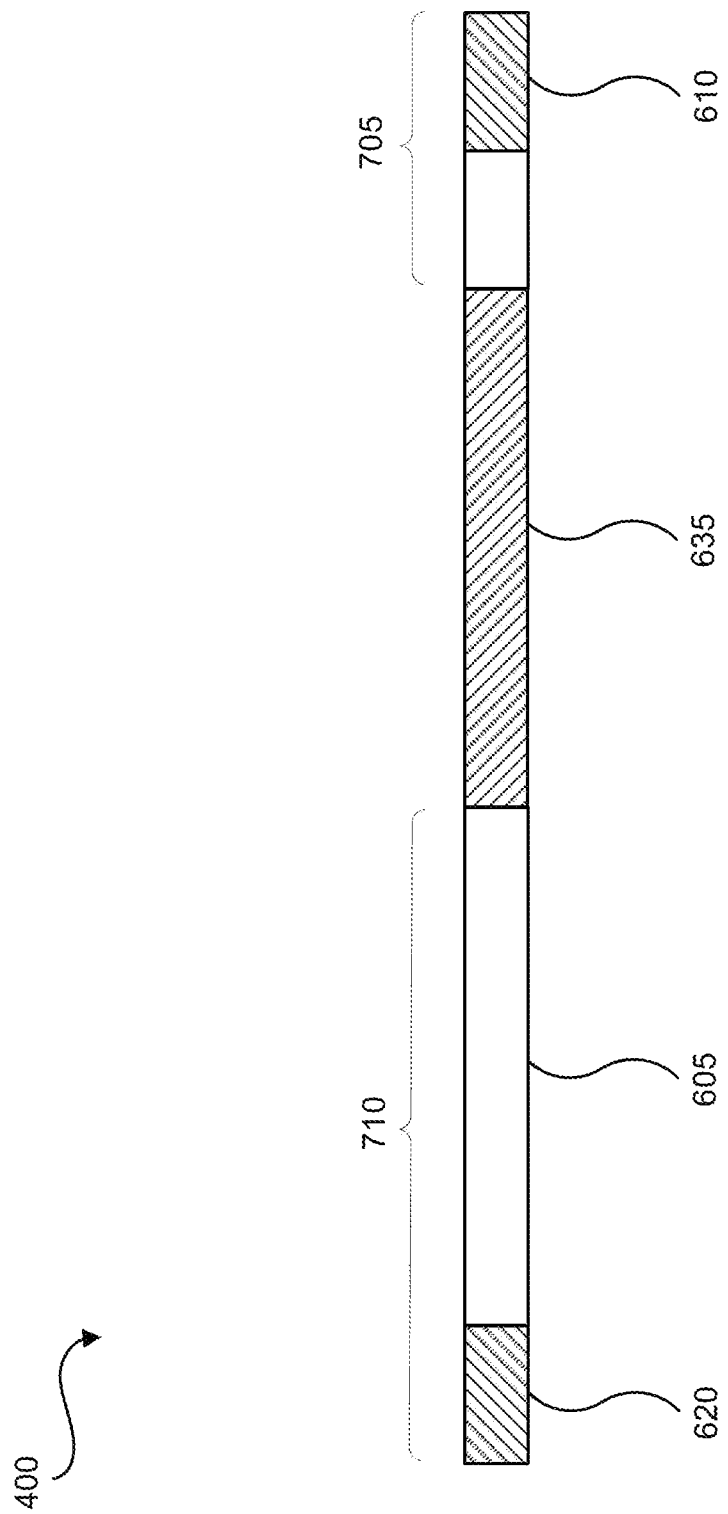
FIG. 7 shows a rear side elevation view of the light guide of FIG. 4.

FIG. 6 also shows four directional arrows that mark the following four directions in relation to LG 400: front, rear, right, and left. These directional arrows are shown for illustrative purposes only, and are not intended to form a part of LG 400. Directional arrows are intended to provide context and linkage between FIG. 7 and FIG. 6. FIG. 7 shows a rear side elevation view of LG 400.

FIG. 7 shows that coupling region 635 is positioned along perimeter 605 outside of regions 610 and 620 where corresponding stray light may become incident upon perimeter 605. Regions of outer perimeter 605 that are outside of coupling regions may be described as nonattachment regions. FIG. 7 shows two nonattachment regions 705 and 710.

In some examples, the material abutting the outer perimeter of LG 400 in the nonattachment regions may be selected to maintain a high refractive index mismatch between LG 400 and the abutting material in the nonattachment regions. For example, an air gap may be maintained at the perimeter of LG 400 in the nonattachment regions. Moreover, in some examples, another low refractive index material may abut the perimeter of LG 400 in the nonattachment regions. Furthermore, in some examples, an optically absorbing material may abut perimeter 605 in the nonattachment regions. In addition, it is contemplated that in some examples the above-mentioned air gaps, low refractive index materials, or optically absorbing materials, may be restricted to regions of perimeter 605 where a stray light is likely to become incident upon perimeter 605 (such as regions 610 and 620) and need not be used throughout the full length of nonattachment regions 705 and 710.

While FIG. 7 shows the rear side elevation view of LG 400, it is contemplated that the abovementioned nonattachment regions, air gaps, low refractive index materials, or optically absorbing materials, may apply also to the remainder of perimeter 605, for example as would be visible in front, left, and right side elevation views. Moreover, while LG 400 is shown as being flat or planar in FIG. 7, it is contemplated that LG 400 may be curved. In some examples, LG 400 may have a curvature similar to the curvature of LG 310 shown in FIG. 3.

Figure 8:
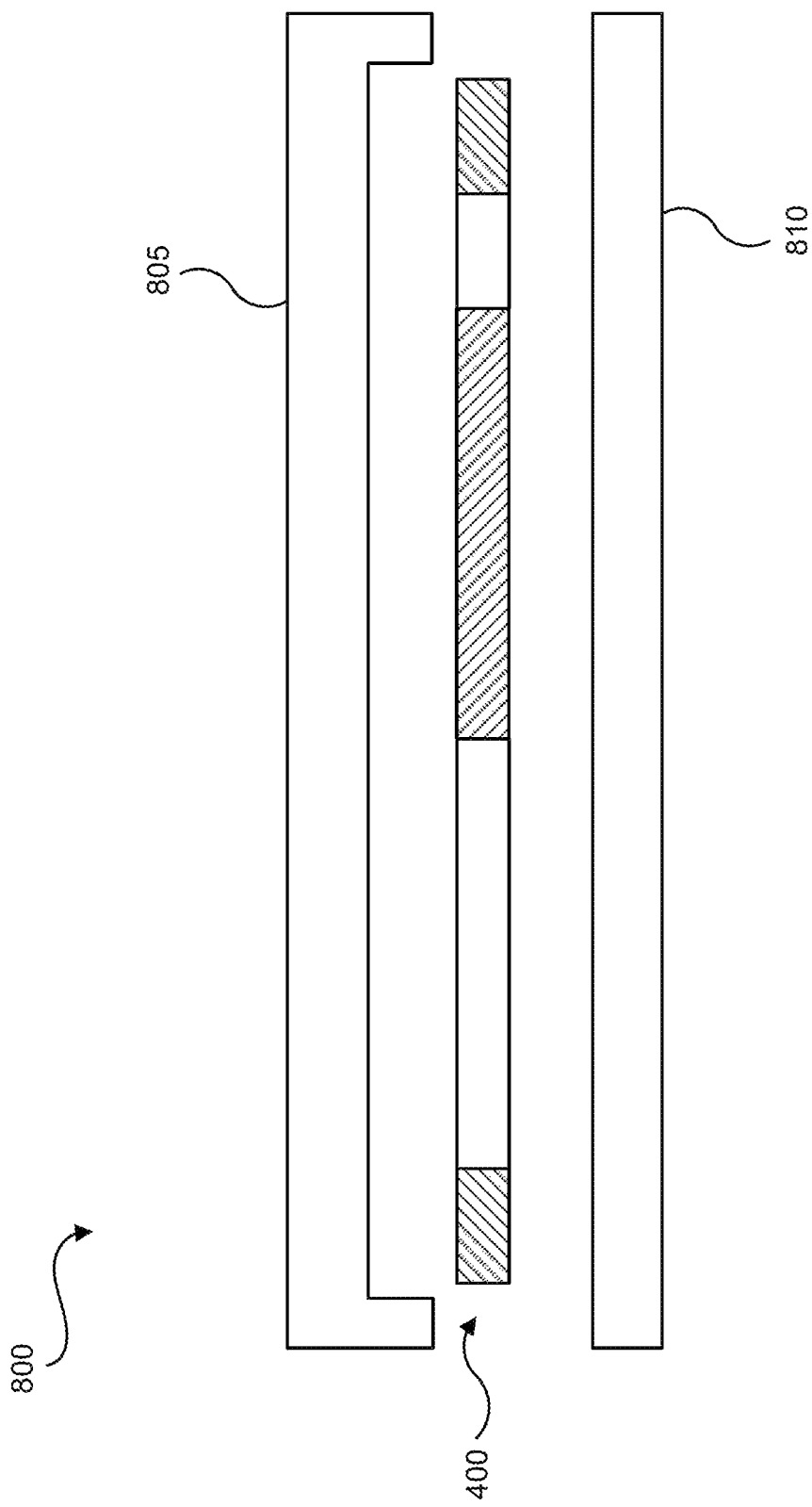
FIG. 8 shows an exploded schematic side elevation view of an example lens, in accordance with one or more embodiments.

Turning now to FIG. 8, an exploded schematic side elevation view is shown of an example lens 800. In some examples, lens 800 may be used as a lens of a WHUD, similar to lens 225 shown in FIG. 2 or lens 305 shown in FIG. 3. Lens 800 may comprise a first lens portion 805, a second lens portion 810, and LG 400. In some examples, to assemble lens 800 LG 400 may be mechanically coupled to lens portion 805, and then lens portion 805 may be mechanically coupled to lens portion 810. It is also contemplated that in some examples, LG 400 may be mechanically coupled to lens portion 810, and lens portion 810 may then be mechanically coupled to lens portion 805.

Figure 9:
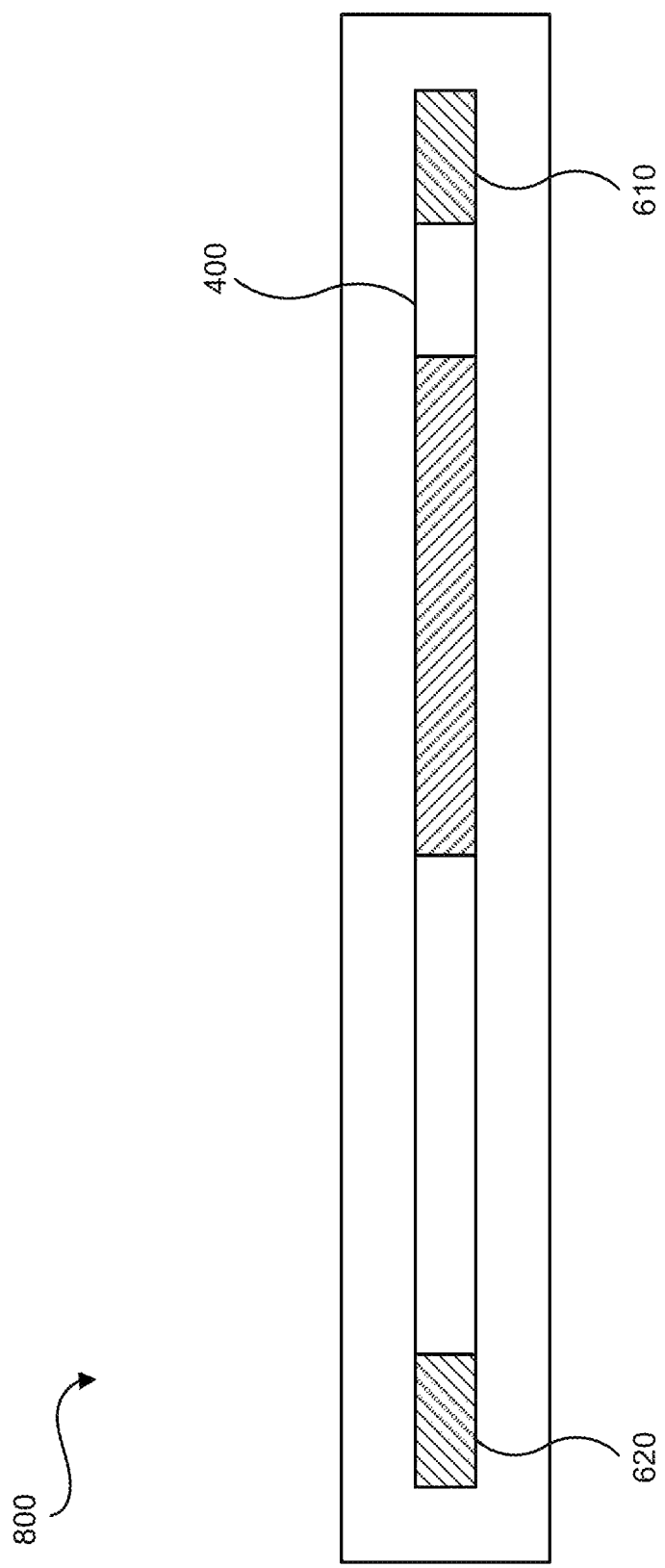
FIG. 9 shows a side elevation view of the lens of FIG. 8.

In some examples, the lens portions the LG 400 may be mechanically coupled to one another using interference fitting, optical adhesives, fusing, and the like. FIG. 9 shows a schematic side elation view of lens 800 when the two lens portions have been mechanically coupled to one another to encapsulate LG 400 within lens 800.

In FIGS. 8 and 9 the lens portions are depicted as transparent to allow LG 400 to be visible in the side elevation views even though LG 400 is encapsulated within lens 800. When LG 400 is encapsulated within lens 800, at the outer perimeter of LG 400 the coupling regions between the lens portions and the perimeter of LG 400 may be positioned outside of the regions where stray light may become incident upon the perimeter of LG 400, such as regions 610 and 620. In some examples, air gaps abutting regions 610 and 620 may be left in lens 800. Moreover, in some examples, the spaces abutting regions 610 and 620 may be filled with other low index materials or with light absorbing materials.

While FIG. 9 shows LG 400 as being fully encapsulated inside lens 800, it is contemplated that in some examples the LG may be partially encapsulated inside the lens. For example, the LG may be coextensive with the two lens portions such that the perimeter of the LG may be exposed at an edge of the lens.

Figure 10:
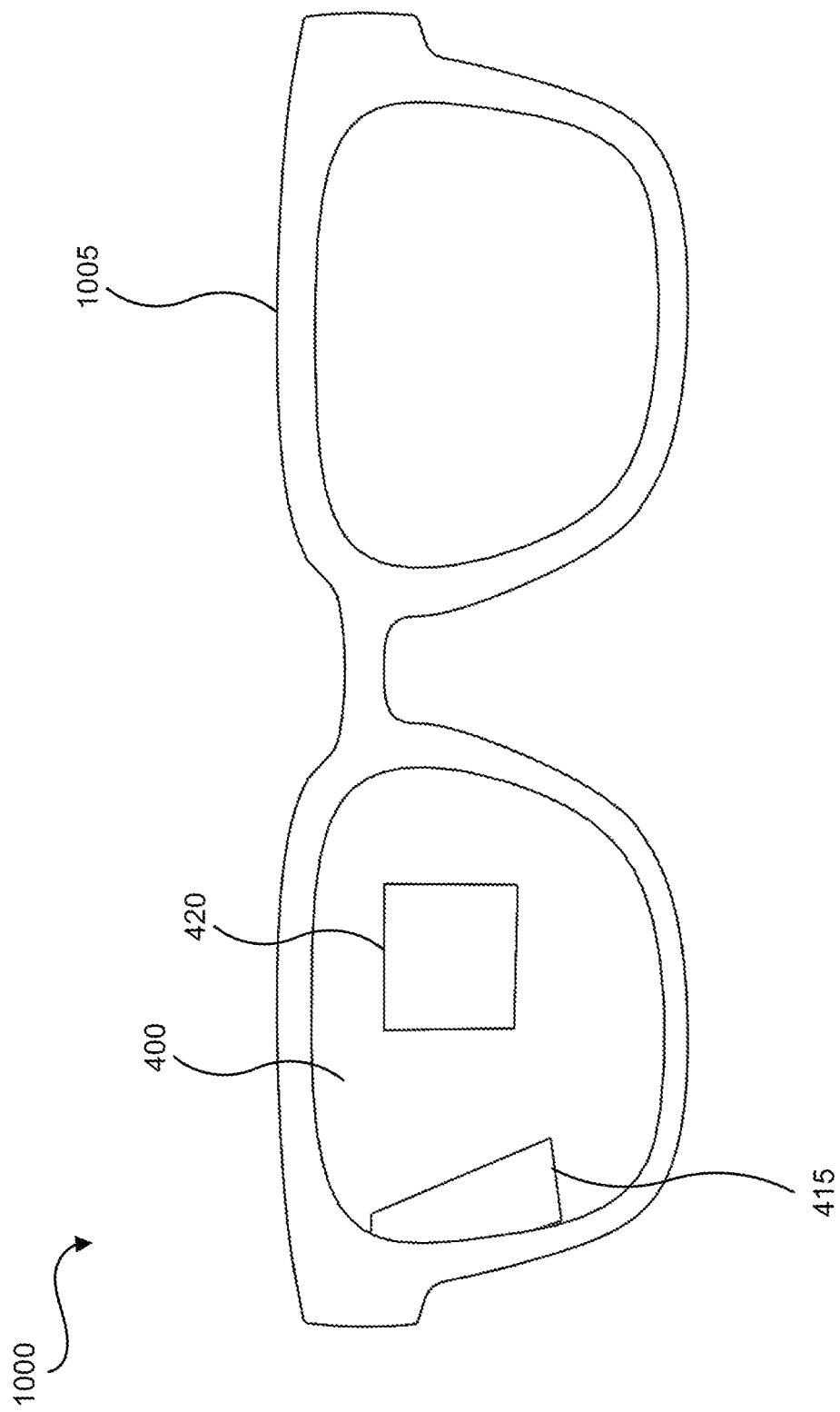
FIG. 10 shows a schematic representation of another example WHUD, in accordance with one or more embodiments.

Turning now to FIG. 10, a schematic representation is shown of a WHUD 1000. WHUD 1000 may be similar to WHUD 200. WHUD 1000 may comprise LG 400 attached to a front frame 1005 of WHUD 1000. In some examples, LG 400 may be at least partially embedded in a lens attached to front frame 1005. Moreover, in some examples LG 400 itself may be the lens attached to front frame 1005. In the case of WHUD 1000, front frame 1005 is the support structure supporting LG 400.

Figure 11:
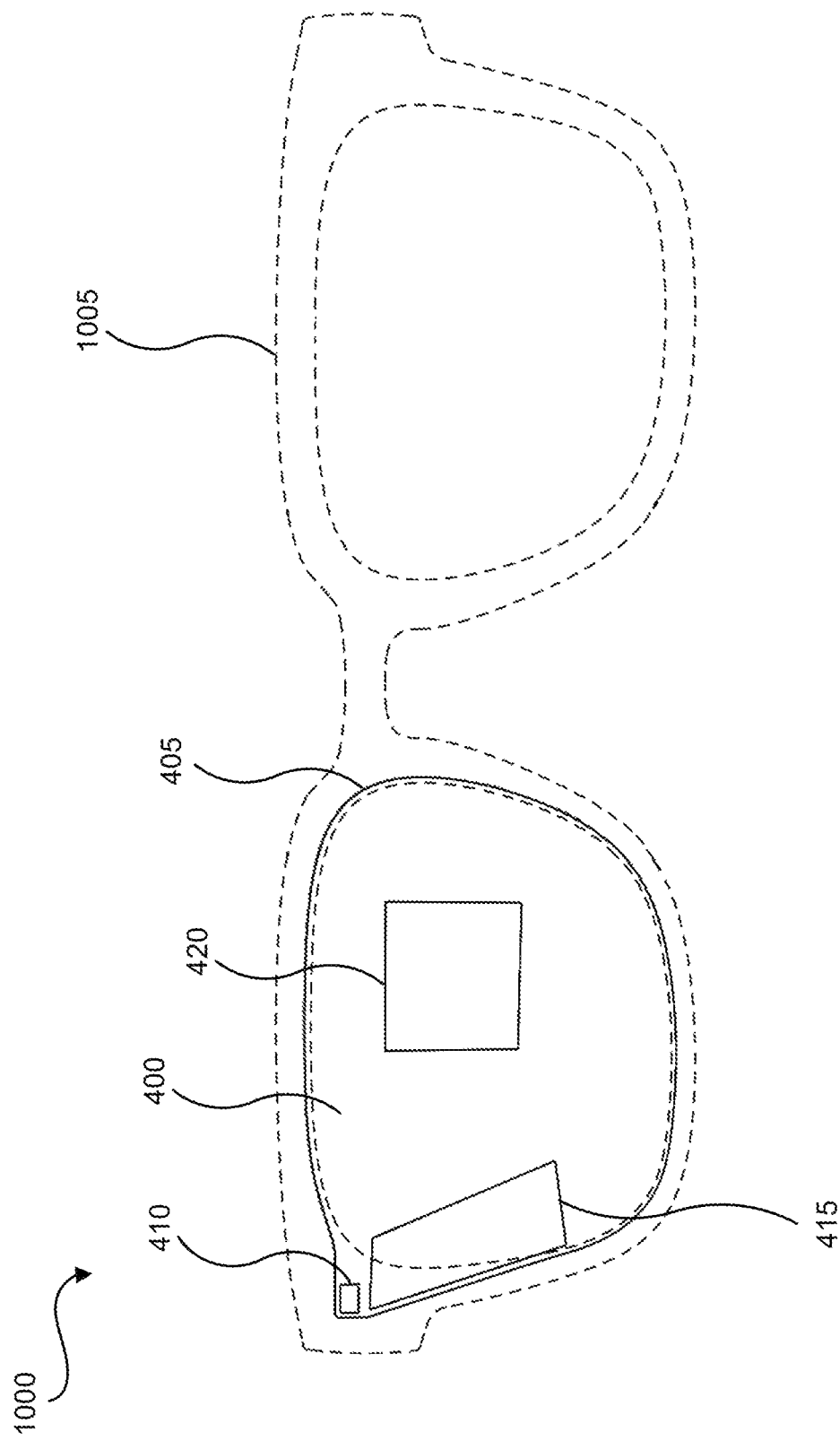
FIG. 11 shows another schematic representation of the WHUD of FIG. 10.
Figure 12:
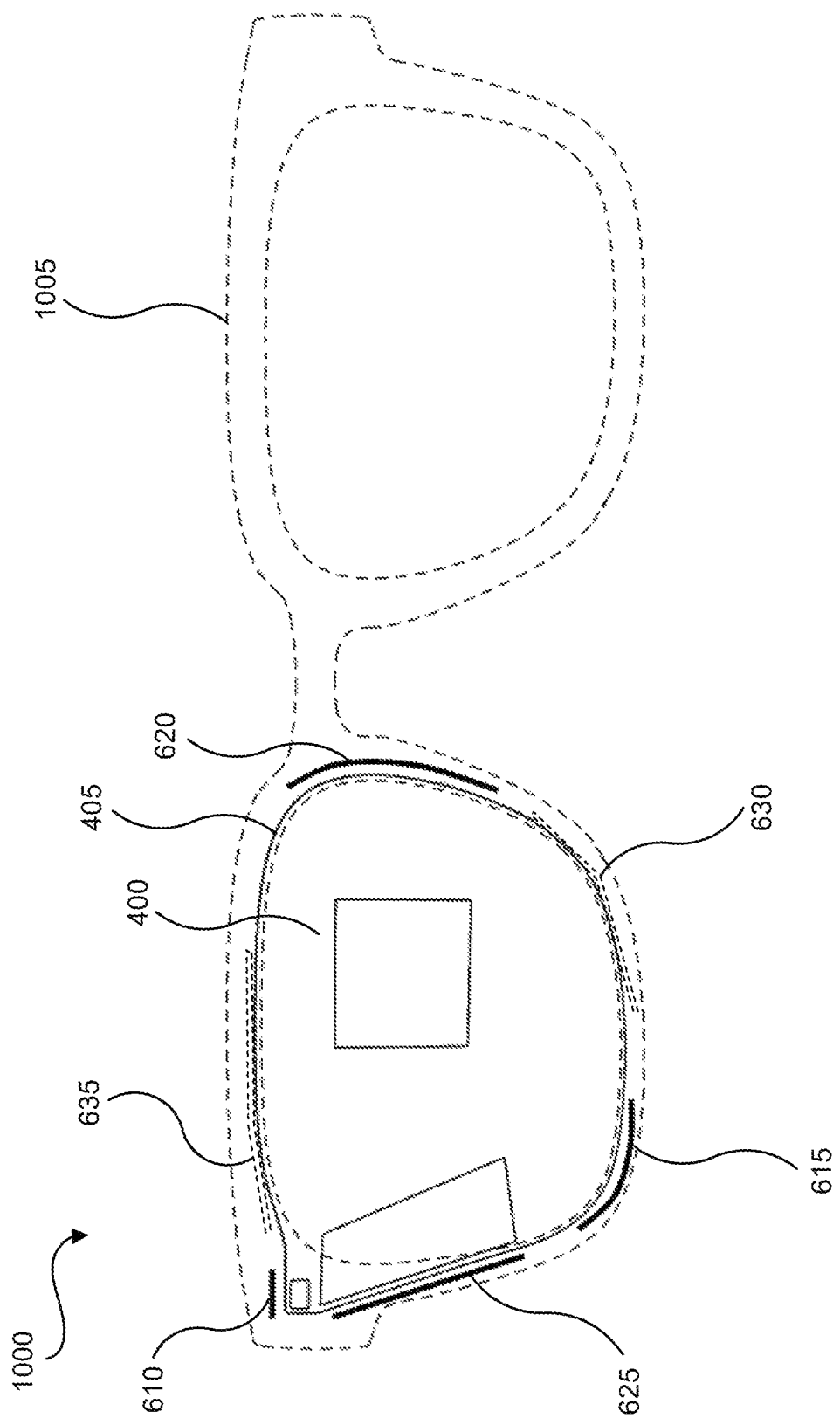
FIG. 12 shows yet another schematic representation of the WHUD of FIG. 10.

FIG. 11 shows WHUD 1000 with front frame 1005 depicted in a transparent manner to render visible perimeter 605 of LG 400. IC 410 is also visible in FIG. 11. FIG. 12 shows regions 610, 615, 620, and 625 where stray light may become incident upon perimeter 605 of LG 400. As described above, the support component for LG 400 in WHUD 1000 may be front frame 1005 of WHUD 1000. In order to reduce or avoid the likelihood of leakage of stray light from LG 400, coupling regions to mechanically couple LG 400 to front frame 1005 may be positioned outside of regions 610, 615, 620, and 625. For example, LG 400 may be mechanically coupled to front frame 1005 at coupling regions 630 and 635, which are outside of regions 610, 615, 620, and 625.

While FIG. 12 shows LG 400 mechanically coupled to front frame 1005 at coupling regions 630 and 635, it is contemplated that in some examples LG 400 may be coupled to front frame 1005 at coupling regions having different numbers, sizes, and positions relative to perimeter 405 of LG 400. Furthermore, it is contemplated that in some examples, one or more coupling regions may be on the front or back surfaces of the LG. The front or back surfaces may refer to the surfaces of the LG that face towards or away from a user respectively, when the LG is incorporated into a glasses frame or WHUD worn by the user. Moreover, in some examples, in WHUD 1000 the spaces abutting regions 610, 615, 620, and 625 of perimeter 405 of LG 400 when LG 400 is attached to front frame 1005 may be filled with air to form air gaps, filled or coated with other low index materials, or filled or coated with light absorbing materials to reduce or avoid the likelihood of stray light leakage from LG 400. In some examples, low index materials may be materials which have a refractive index mismatch with the LG sufficiently large to allow most or all of the stray light incident upon the perimeter of the LG to be reflected back into the LG by internal or total internal reflection.

Figure 13:
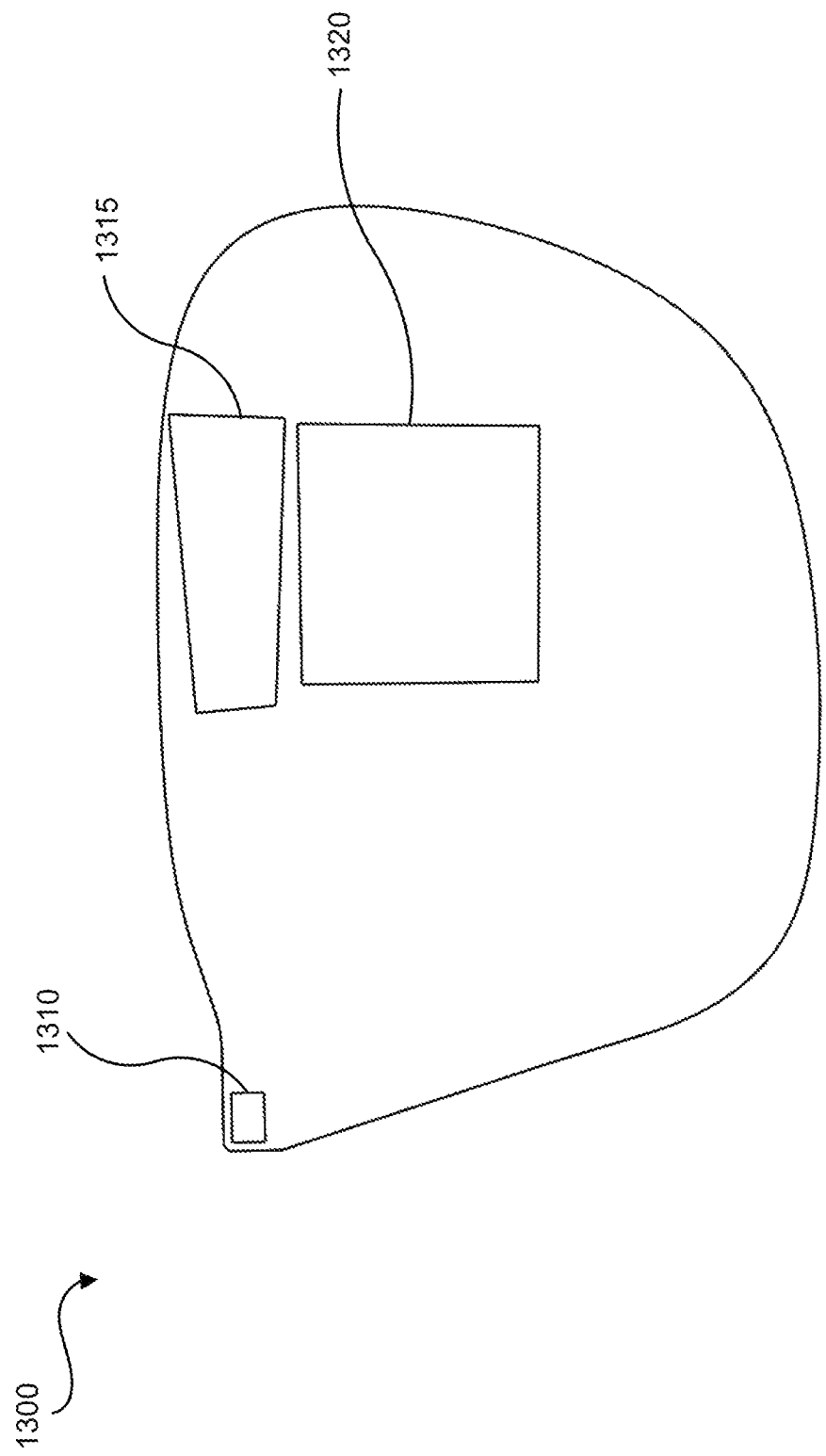
FIG. 13 shows a schematic representation of another example light guide, in accordance with one or more embodiments.

As described above, it is contemplated that in the LG the IC, EPE, and the OC may have sizes or positions relative to the LG other than those shown in relation to LG 400. FIG. 13 shows a schematic representation of an example LG 1300. LG 1300 may comprise an IC 1310, an EPE 1315, and an OC 1320. LG 1300 may be similar to LG 400, with a difference being that the IC, EPE, and OC in LG 1300 are positioned differently relative to LG 1300 than the corresponding IC, EPE, and OC of LG 400. Aside from the difference in the arrangement of IC, EPE, and the OC, LG 1300 may function in the manner similar to LG 400.

Figure 14:
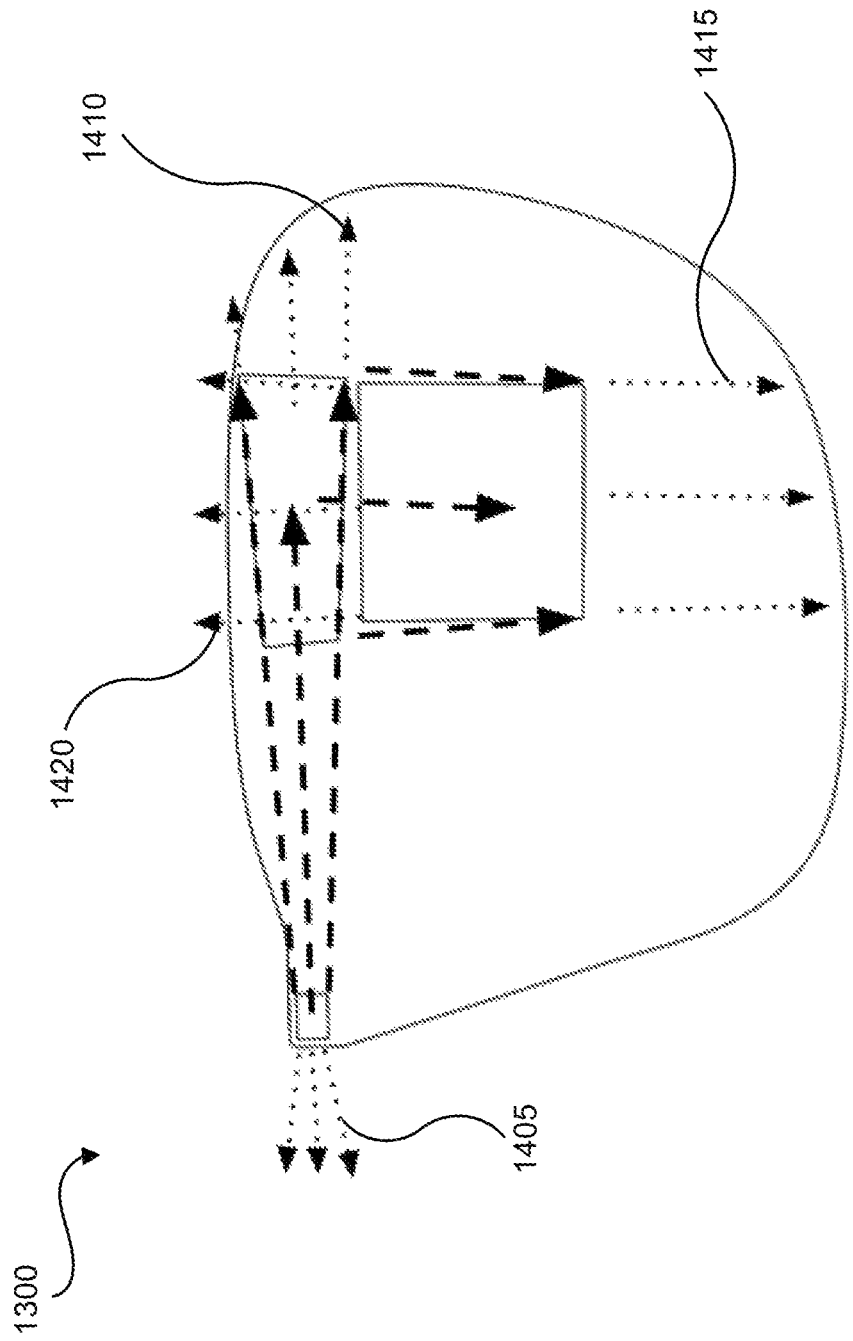
FIG. 14 shows another schematic representation of the light guide of FIG. 13.
Figure 15:
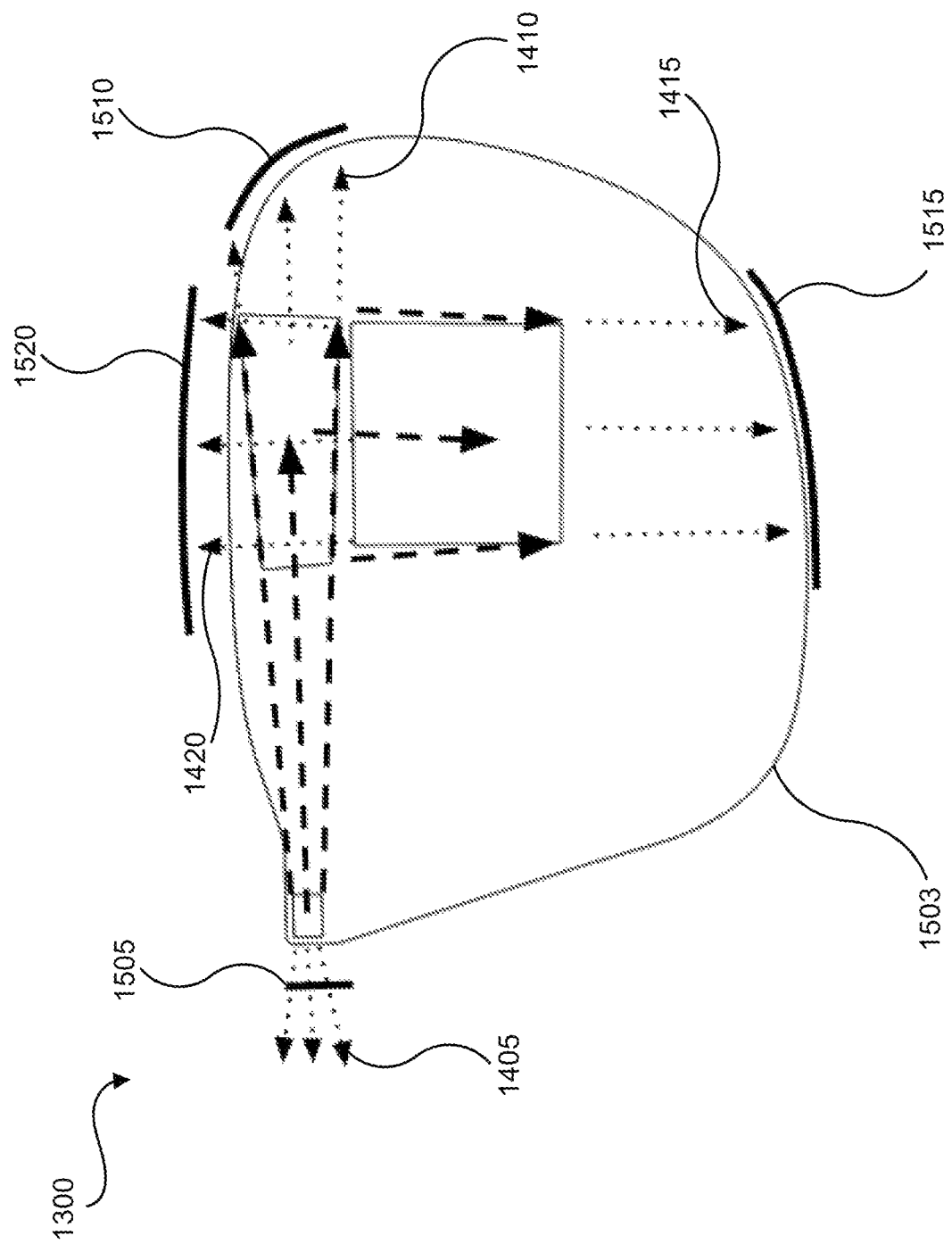
FIG. 15 shows yet another schematic representation of the light guide of FIG. 13.

FIG. 14 shows that similar to LG 400, LG 1300 may generate stray lights 1405, 1410, 1415, and 1420. As shown in FIG. 15, stray lights 1405, 1410, 1415, and 1420, may become incident upon a perimeter 1503 of LG 1300 along regions 1505, 1510, 1515, and 1520 respectively. When LG 1300 is mechanically coupled to a support component, such as a lens or front frame of a WHUD, the coupling regions to mechanically couple LG 1300 to its support component may be positioned outside of regions 1505, 1510, 1515, and 1520 to reduce or minimize the likelihood of stray light leaking from LG 1300.

Turning now to FIG. 16, a flowchart is shown of an example method 1600 of assembling an optical device. In some examples, the optical device may comprise an LG to be attached to a support component. In some examples, the LG may be similar to LG 400, LG 1300, or another one of the LG's described herein. Moreover, in some examples, the support component may comprise a lens or front frame of a WHUD similar respectively to lens 800 and front frame 1005, and the like.

The LG may receive a display light from a light engine, and may direct a first portion of the display light out of the LG to form an outcoupled light. The LG may also cause a second portion of the display light to become incident upon an outer perimeter of the LG at one or more LG regions to form one or more stray lights respectively. In some examples, the stray lights and the corresponding LG regions may be similar to the stray lights and the corresponding regions of incidence of those stray lights on the perimeter of the LG described in relation to FIGS. 6 and 15.

At box 1605 of method 1600, the support component may be mechanically coupled to the LG at one or more coupling regions. The coupling regions may be positioned outside of the one or more LG regions. As discussed above, positioning the coupling regions outside of the regions where the stray light is likely to become incident upon the outer perimeter of the LG may reduce or avoid the likelihood of stray light leaking from the LG.

In some examples, mechanically coupling the LG to the support component may comprise affixing the support component to the LG using an adhesive. In some examples, this adhesive may comprise an optical grade adhesive, and the like. Moreover, in some examples, mechanically coupling the support component of the LG may comprise interference fitting the support component to the LG.

Furthermore, in some examples, the support component may comprise a lens of eyeglasses. In addition, in some examples, the lens may comprise a lens of a WHUD. For example, this lens may be similar to lens 225, 305, or 800. Furthermore, in some examples, the support component may comprise a front frame of eyeglasses. Moreover, in some examples, the front frame may be a front frame of a WHUD. For example, the front frame may be similar to front frames 240, 1005, and the like.

In some examples, mechanically coupling the LG to a lens of eyeglasses may comprise at least partially encapsulating the LG in the lens. In addition, in some examples, the lens may comprise a first lens portion and a second and portion. An example of a lens having two portions is described in relation to FIGS. 8 and 9. At least partially encapsulating the LG in the lens may comprise mechanically coupling the LG to the first lens portion, and mechanically coupling the first lens portion to the second lens portion.

While some of the examples provided herein are described in the context of laser projectors and WHUDs, it is contemplated that the functions and methods described herein may be implemented in or by display systems or devices which may not use laser projectors or be WHUDs.

Throughout this specification and the appended claims, infinitive verb forms are often used. Examples include, without limitation: "to direct," "to form," "to receive," "to cause," and the like. Unless the specific context requires otherwise, such infinitive verb forms are used in an open, inclusive sense, that is as "to, at least, direct," to, at least, form," "to, at least, receive," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

What is claimed is:

1. An optical device comprising:
a light guide (LG) having an outer perimeter and comprising:
an incoupler (IC), an exit pupil expander (EPE), and an outcoupler (OC), wherein:
the IC is configured to direct a first portion of a display light into the LG to form an incoupled light propagating in the LG towards the EPE and direct a second portion of the display light into the LG to form a first stray light incident upon the outer perimeter of the LG at a first region of the outer perimeter;
the EPE is configured to receive the incoupled light propagating in the LG, direct a first portion of the incoupled light towards the OC to form an intermediate light, and direct a second portion of the incoupled light to form a second stray light incident upon the outer perimeter of the LG at a second region of the outer perimeter; and
the OC is configured to receive the intermediate light propagating in the LG and to direct a first portion of the intermediate light out of the LG to form an outcoupled light and direct a second portion of the intermediate light to form a third stray light incident upon the outer perimeter of the LG at a third region of the outer perimeter; and
a support component supporting the LG, the support component mechanically coupled to the LG at one or more coupling regions of the outer perimeter of the LG, wherein the one or more coupling regions are positioned outside the first, second, and third regions of the outer perimeter of the LG.

2. The optical device of claim 1, wherein the support component comprises an eyeglass lens.

3. The optical device of claim 1, wherein the support component comprises a lens of a wearable heads-up display (WHUD).

4. The optical device of claim 1, wherein the support component comprises a front frame of eyeglasses.

5. The optical device of claim 1, wherein the support component comprises a front frame of a wearable heads-up display (WHUD).

6. The optical device of claim 1, wherein:
the OC is further to cause a third portion of the intermediate light to propagate in the LG towards the EPE to form a fourth stray light, the fourth stray light to become incident upon the outer perimeter of the LG at a fourth region of the outer perimeter; and
the coupling regions are further positioned outside the fourth region.

7. A wearable heads-up display (WHUD) comprising:
a support structure;
a light engine attached to the support structure, the light engine to generate a display light; and
a light guide (LG) having an outer perimeter and comprising:
an incoupler (IC), an exit pupil expander (EPE), and an outcoupler (OC), wherein:
the IC is configured direct a first portion of a display light into the LG to form an incoupled light propagating in the LG towards the EPE, and to direct a second portion of the display light into the LG to form a first stray light incident upon the outer perimeter of the LG at a first region of the outer perimeter;
the EPE is configured to receive the incoupled light propagating in the LG, direct a first portion of the incoupled light towards the OC to form an intermediate light, and to cause a second portion of the incoupled light to form a second stray light incident upon the outer perimeter of the LG at a second region of the outer perimeter; and the OC is configured to receive the intermediate light propagating in the LG, direct a first portion of the intermediate light out of the LG to form an outcoupled light, and direct a second portion of the intermediate light to continue propagating in the LG to form a third stray light incident upon the outer perimeter of the LG at a third region of the outer perimeter; and a support component supporting the LG, the support component attached to the support structure, the support component mechanically coupled to the LG at one or more coupling regions of the outer perimeter of the LG, wherein the one or more coupling regions are positioned outside the first, second, and third regions of the outer perimeter of the LG.

8. The WHUD of claim 7, wherein the support component comprises an eyeglass lens.

9. The WHUD of claim 7, wherein the support structure comprises an eyeglass frame.

10. The WHUD of claim 7, wherein the support component comprises a front frame of eyeglasses.

11. The WHUD of claim 10, wherein the support structure comprises at least one temple arm of the eyeglasses, the temple arm coupled to the front frame.

12. The WHUD of claim 7, wherein:
the OC is further to cause a third portion of the intermediate light to propagate in the LG towards the EPE to form a fourth stray light, the fourth stray light to become incident upon the outer perimeter of the LG at a fourth region of the outer perimeter; and
the coupling regions are further positioned outside of the fourth region.

13. A method of assembling an optical device comprising a light guide (LG) to be attached to a support component configured to support the LG, the LG having an outer perimeter and being configured to receive a display light from a light engine, the method comprising:
mechanically coupling the support component to the LG at one or more coupling regions of the outer perimeter of the LG, wherein:
the LG comprises an incoupler (IC), an exit pupil expander (EPE), and an outcoupler (OC):
the IC is configured to direct a first portion of the display light into the LG to form an incoupled light propagating in the LG towards the EPE and direct a second portion of the display light into the LG to form a first stray light incident upon the outer perimeter of the LG at a first region of the outer perimeter;

the EPE is configured to receive the incoupled light propagating in the LG, direct a first portion of the incoupled light towards the OC to form an intermediate light, and direct a second portion of the incoupled light to form a second stray light incident upon the outer perimeter of the LG at a second region of the outer perimeter;

the OC is configured to receive the intermediate light propagating in the LG and to direct a first portion of the intermediate light out of the LG to form an outcoupled light and direct a second portion of the intermediate light to form a third stray light incident upon the outer perimeter of the LG at a third region of the outer perimeter; and the one or more coupling regions positioned outside of the first, second, and third regions of the outer perimeter of the LG.

14. The method of claim 13, wherein the mechanically coupling comprises affixing the support component to the LG using an adhesive.

15. The method of claim 13, wherein the mechanically coupling comprises interference fitting the support component to the LG.

16. The method of claim 13, wherein the mechanically coupling comprises mechanically coupling the LG to a lens of eyeglasses.

17. The method of claim 16, wherein the mechanically coupling the LG to the lens of the eyeglasses comprises mechanically coupling the LG to a lens of a wearable heads-up display (WHUD).

18. The method of claim 16, wherein the mechanically coupling the LG to the lens of the eyeglasses comprises at least partially encapsulating the LG in the lens.

19. The method of claim 18, wherein:
the lens comprises a first lens portion and a second lens portion; and
the at least partially encapsulating the LG in the lens comprises:
mechanically coupling the LG to the first lens portion; and
mechanically coupling the first lens portion to the second lens portion.

20. The method of claim 13, wherein the mechanically coupling comprises mechanically coupling the LG to a front frame of eyeglasses.

21. The method of claim 20, wherein the mechanically coupling the LG to the front frame of the eyeglasses comprises mechanically coupling the LG to a front frame of a wearable heads-up display (WHUD).

* * * * *